United States Patent Office 2,987,698
Patented June 6, 1961

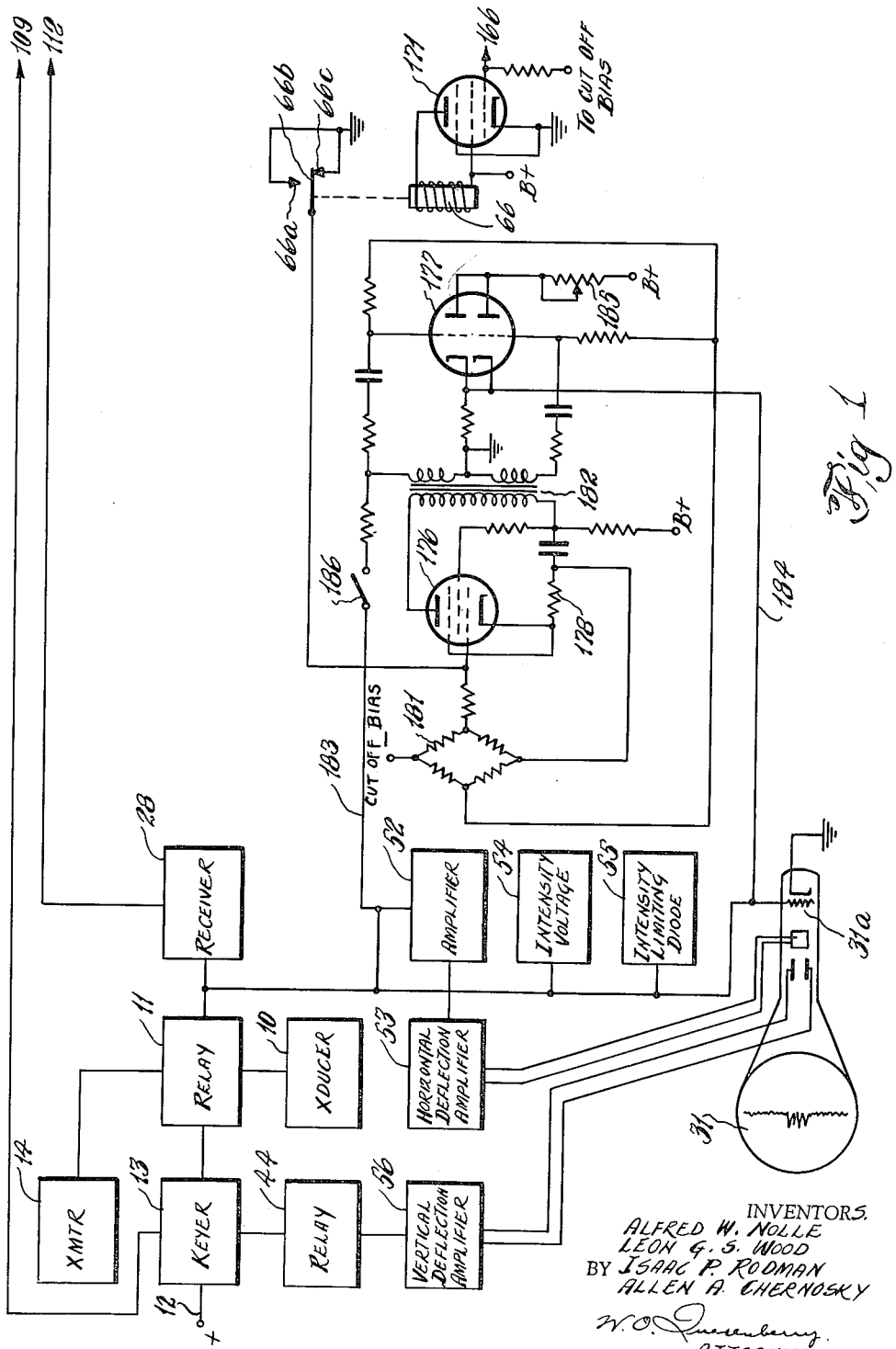

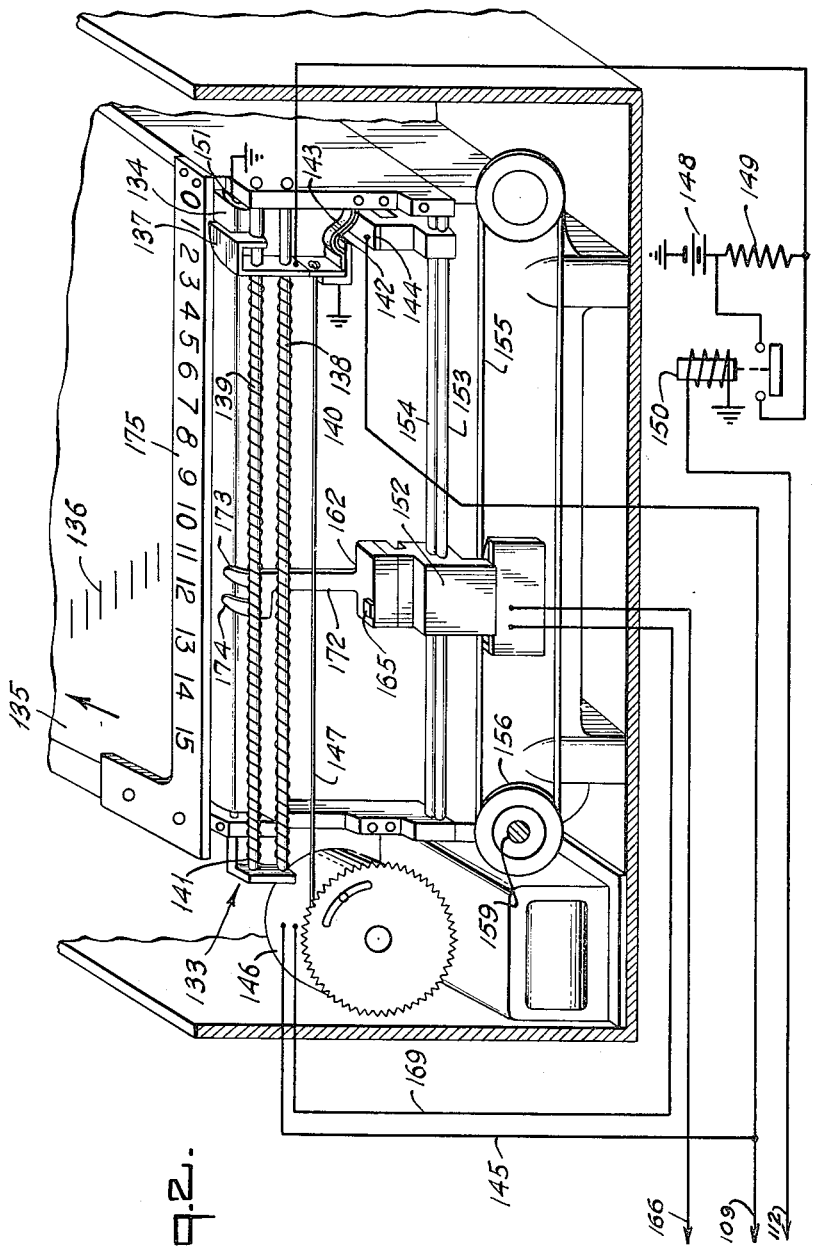

2,987,698
INDICATING A SELECTED TARGET ECHO IN AN ECHO WAVE TRAIN OBTAINED BY ECHO RANGING

Isaac P. Rodman, Alfred Wilson Nolle, and Allen A. Chernosky, Cambridge, and Leon G. S. Wood, Quincy, Mass., assignors to the United States of America as represented by the Secretary of the Navy Original application Mar. 30, 1945, Ser. No. 585,768, now Patent No. 2,709,796, dated May 31, 1955. Divided and this application June 10, 1952, Ser. No. 292,604

3 Claims. (Cl. 340—3)

This invention relates to echo ranging equipment employing either compressional wave or radiant energy and having a cathode ray tube for echo display.

An object of this invention is to improve echo wave train display on a cathode ray tube of an echo ranging equipment by modifying the echo display trace on the cathode ray tube so that the portion of the echo display which is of primary interest is readily distinguishable from the remainder of the echo display.

A further object is to provide an improved echo ranging system having a cathode ray tube for displaying successive echo wave trains, wherein that portion of each echo wave train arriving from a preselected range is bracketed on the cathode ray tube display of the echo wave trains.

Other objects and many of the attendant advantages of this invention will be readily appreciated as the same becomes better understood by reference to the following detailed description when considered in connection with the accompanying drawings wherein:

FIG. 1 is a circuit diagram, partly in schematic and partly in block, of an echo ranging system including an embodiment of this invention, and FIG. 2 is a partial perspective of a conventional range recorder as modified in accordance with the requirements of a feature of this invention.

This application is a division of application serial number 585,768, filed March 30, 1945 and which is now U.S. Patent 2,709,796; the reference characters in this description correspond to those in the parent application.

The illustrated embodiment of the invention includes an underwater transducer 10 which may be either of the piezo-electric or magnetostrictive type and of conventional construction. A relay 11, the winding of which is energized intermittently and momentarily from a power source 12 through keyer 13 functions when energized to momentarily connect the output at supersonic frequency from transmitter oscillator 14 to the transducer 10. The electrical energy imparted as a pulse of short duration to the transducer, causes the latter to deliver a pulse of compressional wave energy that is projected through the water.

When relay 11 is deenergized, the projected pulse is terminated and the relay 11 then connects the transducer to the receiver 28. Should the projected pulse strike an underwater obstruction and be reflected, the pulse echo will return to and mechanically excite the transducer 10 causing the transducer to generate voltage corresponding thereto, which voltage is passed on to receiver 28.

A cathode ray oscilloscope is utilized to display the echo wave trains. A relay 44 which is controlled from keyer 13 triggers the vertical deflection amplifier 56 to commence a sweep synchronous with each pulse transmission from the transducer 10. The echo wave trains are coupled also through amplifier 52 to the horizontal deflection amplifier 53 and the latter in turn provides deflection voltage to the horizontal deflection plates of oscilloscope 31.

The cathode ray beam of tube 31 is maintained at a relatively low intensity except when an echo wave train passes through relay 11. The means for doing this includes an intensity voltage circuit responsive to the echo wave trains to make more positive the bias on brightening grid 31a of tube 31.

In order to prevent excessive brightening of the cathode ray beam spot, the output of intensity voltage circuit 54 is applied across an intensity limiting diode 55. Whenever the output of intensity voltage circuit 54 rises above a preselected value, the diode 55 passes current and hence prevents any further rise of voltage on the grid 31a.

The disclosed embodiment includes a range recorder of conventional construction and hence only a fragmentary portion has been illustrated in FIG. 2. It will be appreciated, however, that the same action and control can be supplied by any number of devices which move in accordance with, or are influenced by a change in the range. The range recorder 133 comprises a mechanism by which a stylus 134 is moved laterally across a chart 135 at a rate such that the stylus position is an indication of the range of the target pulse echo with respect to the observer's ship, the echo being a reflected portion of the pulse emitted when the stylus was at the zero range position. In the illustrated recorder, which is of the electro-chemical type, the stylus marks a line 136 on the chart as sound is received by the projector, the density of which is in proportion to the received acoustic level so that a true echo appears as a dark spot in a light line. The chart paper is carried on a roll and moved continuously in the direction indicated by the arrow, a new trace being started each time that a pulse is sent out. Thus once the echo ranging system has established sound contact with the target, and the recorder put in operation, there will be a separate trace established on the chart for each pulse.

In particular, it will be noted that stylus 134 is carried by a slider arm 137 having a pair of apertures through which pass rods 138, 139. These rods are anchored at their ends to the recorder frame and carry flyback springs 140, 141. One end of each spring bears against the recorder frame and the other against the arm 137.

Supported at the bottom of arm 137, but electrically insulated therefrom are a pair of resilient contact fingers 142, 143 which are grounded. When arm 137 is in the position shown which is the zero range position, it is seen that contact finger 142 is in contact with stationary contact member 144. Conductor 109 leads from contact 144 back to keyer 13. Thus as conductor 109 becomes grounded through contact members 142 and 144, keyer 13 operates to close relay 11 momentarily to send out a short pulse of compressional wave energy. By means of a branch conductor 145 connected to conductor 109, a motor 146, started at this same time, begins to wind up a flexible cord 147, the end of which is attached to arm 137, sliding the latter on rods 138, 139 across the chart and compressing springs 140, 141.

Stylus 134 is connected with the electro-chemical chart paper 135 in a circuit which may include a battery 148, resistor 149 and relay 150. The circuit may be traced from the negative side of battery 148 which is grounded, through resistor 149, stylus 134, chart paper 135, and roll 151 to ground, the roll 151 being in contact with the underside of chart paper 135 at the point of contact with stylus 134. Thus as the stylus 134 begins to move across the chart, a small amount of current flowing from the stylus through the paper in the circuit just described causes a faint line to be traced. However when the target pulse echo returns and is put through receiver 28, it is seen that the audio output from receiver 28 is also fed over conductor 112 to thereby energize relay 150. As the contacts of this relay close, resistor 149 is shunted out of the stylus-chart circuit causing an increase in current and thereby making the chart trace much darker for the duration of the echo pulse. If desired stylus 134 may be connected through a suitable gain control, directly to receiver output lead 112. In the case of the latter, the density of the line marked in the recorder paper is a function of the receiver output and will appear heavy during the reverberation period and then lighter except for the interval denoting reception of a target echo. Recorder 133 is also provided with a contact block 152 which is supported by parallel rods 153, 154 and moved laterally thereon by an endless belt 155 trained over a drive pulley 156, the latter being driven when necessary.

Block 152 carries one long contact 162 and one short contact 165. Contact 162 has a length corresponding to approximately 100 yards as measured on the 1500 yard range scale 175 of recorder 133.

Conductor 166 is connected to contact 162. Conductor 169 connects contact 165 into the control circuit for motor 146. Block 152 is so located that as arm 137 moves across the chart, grounded contact finger 143 will come into engagement with contact 162. When this occurs, a circuit connected to contact 162 will assume ground potential and similarly as contact finger 142 rides over contact 165, the abovementioned control circuit for motor 146 will be grounded.

Reference now to the circuit diagram in FIG. 1 will show that contact 162, the relay control or gate interval contact, is connected to the normally over-biased grid of tube 171, so that when the ground connection is established, the tube will conduct and energize the winding of a relay 66 causing the latter to pull in its contacts. As illustrated, the contacts of relay 66 are shown in the positions they occupy when this relay winding is deenergized.

When contact finger 142 comes into contact with contact member 165, the conductor 169 associated therewith also becomes grounded and serves to declutch motor 146 thereby allowing arm member 137 carrying stylus 134 to fly back to the zero range position under the restoring force which had been built up in springs 140, 141 as these were compressed by motion of arm 137 in the opposite direction. Another pulse is then transmitted, motor 146 is again energized and arm 137 is started across chart 135 to record another trace.

Block 152 is connected to belt 155 by a friction coupling which may be a double overrunning friction clutch of conventional design, not illustrated, which permits the block 152 to be slipped along belt 155 by hand to set it to the correct position when the apparatus is first put into operation. In connection with this feature, it will be seen that block 152 carries an arm 172 which terminates in a pair of indicating fingers 173, 174. These fingers are positioned adjacent the range scale 175. The distance between the pointed ends of the fingers 173, 174 is the same as the length of contact 162. Hence the operator is always informed as to the position of block 152.

By means of circuit means shown in FIG. 1, the range limits bracketed by indicating fingers 173, 174 of the range recorder are defined either as instantaneous lines across the face of the oscilloscope screen or as bright dots at the beginning and end of the corresponding portion of the echo wave train. This indicating circuit includes tubes 176, 177 and is operated by contacts 66a, 66b, and 66c of relay 66; while contact 66b rests on contact 66c, tube 176 is biased only by the voltage drop across a resistor 178 which serves to prevent excessive plate current. When contact 66b moves away from contact 66c, cut-off bias is applied from the cut-off bias source through a voltage divider 181, causing a rapid collapse of the plate current through the primary of a transformer 182. As soon as relay contact 66c has completed its travel to contact 66a, the grid of tube 176 is returned to ground and the flow of plate current of tube 176 through transformer 182 is resumed.

The system remains quiescent while relay 66 is energized, but when the relay is deenergized at the end of the gate interval, the collapse and the reestablishing cycle is repeated.

The current pulses in the primary transformer 182 are differentiated in the transformer and applied in terms of voltage changes in the secondary. These secondary voltages are fed via conductor 183 through amplifier 52 to the horizontal deflection amplifier 53 of the oscilloscope 31. However, unless additional brightening is supplied, the pulses cannot be seen upon the screen of the oscilloscope. To produce the necessary brightening, the voltage surges in transformer 182 are delivered to the grids of tubes 177 with the result that one half or the other half of this tube draws increased current. The plates of tubes 177 are connected to each other and to B+. The brightening grid 31a of the oscilloscope 31 is connected to the cathodes of tube 177. This circuit extends over conductor 184 to the brightening grid 31a. Hence the bias of the tube 31 is reduced as tube 177 conducts causing the beam spot to brighten to such an extent that the range marks are clearly visible. The degree of brightening can be preset or controlled by potentiometer 185.

If the operator prefers bright dots to line range limit indications, it is only necessary to open the connection to the deflection amplifier 52 by switch 186, leaving only the brightening connections from tube 177 intact.

In operation, when an echo has been received, the conning officer sets the position of the echo trace 136 and moves the range gate arm 172 so that fingers 173, 174 bracket this trace. In so doing he has properly positioned the block 152 and its associated contacts. As the recorder operates, the stylus carriage 137 sweeps back and forth. With each forward movement, contacts 142, 143 are swept across contact 162 causing relay 66 to close as the bias is removed from tube 171.

While the invention has been described in connection with a specific type of receiver and recorder it should be understood that numerous changes in the circuits and components can be made without departing from the spirit of the invention as defined in the appended claims.

Having fully described this invention, we claim:

1. In an echo ranging system, a cathode ray tube display device including grid-cathode bias means whereby a luminous spot of moderate brightness appears on the tube face and further including a pair of orthogonal spot deflection means, a mechanical device having a member movable to and fro along a linear path calibrated in terms of range, a first electrical contact at a selected potential attached to said member and movable therewith, a second electrical contact at the end of said linear path corresponding to zero range and engageable by said first contact, circuit means connected to said second electrical contact and one of said deflection means for causing the luminous spot to commence a traverse at a constant rate across the tube face synchronously with engagement of said first and second contacts, means for moving said member at a constant rate along its linear path from the zero range end where said contacts are engaged and for releasing said member a predetermined distance from the zero range end, means for quickly returning said member after release to where said contacts engage, third contact means in the path of said first contact and engageable thereby as said member traverses its path, said third contact means being linearly adjustable to any position alongside the path of said first contact, a vacuum tube having at least an anode a grid and cathode, means connected between the grid and cathode of said vacuum tube for biasing said vacuum tube substantially to cutoff, means connected to said first contact means and said third contact means and to said cutoff bias means for normally disabling said cut off bias means and for momentarily enabling said cutoff bias means to cut off said vacuum tube when said first and third contacts either engage or disengage to reduce anode conduction of said vacuum tube, a transformer having a primary winding and a center-tapped secondary winding, an anode circuit for said vacuum tube including said primary winding, a pair of second vacuum tubes each having an anode, a grid, and a cathode, third biasing means connected between the cathodes and grids of said pair of vacuum tubes for rendering them normally nonconductive, means connecting the ends of said secondary winding to said control grids of said pair of second vacuum tubes, a common anode circuit and a common cathode circuit for said pair of vacuum tubes, means connecting said center tap to said common cathode circuit whereby one of said second vacuum tubes is rendered momentarily conductive whenever said first contact means and said third contact means engage and the other of said second vacuum tubes is rendered momentarily conductive whenever said first contact means and said third contact means disengage, means connected between one of said common circuits of said pair of vacuum tubes and said bias means of said cathode ray tube to cause the spot to brighten at each point corresponding to where said first contact means and said third contact means engage and disengage.

2. In an echo ranging system as defined in claim 1 further including circuit means connected between one end of said secondary and the other one of said orthogonal spot deflection means to cause the cathode ray tube spot to be momentarily deflected transversely to its traverse when said first contact and third contact means are engaged.

3. In an echo ranging system, a cathode ray tube display device including grid-cathode bias means whereby a luminous spot of moderate brightness appears on the tube face and further including a pair of orthogonal spot deflection means, a mechanical device having a member movable to and fro along a linear path calibrated in terms of range, a first electrical contact at a selected potential attached to said member and movable therewith, a second electrical contact at the end of said linear path corresponding to zero range and engageable by said first contact, circuit means connected to said second electrical contact and one of said deflection means for causing the luminous spot to commence a traverse at a contact rate across the tube face synchronously with engagement of said first and second contacts, means for moving said member at a constant rate along its linear path from the zero range end where said contacts are engaged and for releasing said member a predetermined distance from the zero range end, means for quickly returning said member after release to where said contacts engage, third contact means in the path of said first contact and engageable thereby as said member traverses its path, said third contact means being linearly adjustable to any position alongside the path of said first contact, a vacuum tube having at least an anode a grid and cathode, means connected between the grid and cathode of said vacuum tube for biasing said vacuum tube substantially to cut off, means connected to said first contact means and said third contact means and to said cutoff bias means and operable when said first and third contact means either engage or disengage, for momentarily changing the bias on said vacuum for momentarily changing the level of anode conduction in said vacuum tube, a transformer having a primary winding and a center-tapped secondary winding, an anode circuit for said vacuum tube including said primary winding, a pair of second vacuum tubes each having an anode, a grid, and a cathode, third biasing means connected between the cathode and grids of said pair of vacuum tubes for rendering them normally nonconductive, means connecting the ends of said secondary winding to said control grids of said pair of second vacuum tubes, a common anode circuit and a common cathode circuit for said pair of vacuum tubes, means connecting said center tap to said common cathode circuit whereby one of said second vacuum tubes is rendered momentarily conductive whenever said first contact means and said third contact means engage and the other of said second vacuum tubes is rendered momentarily conductive whenever said first contact means and said third contact means disengage, means connected between one of said common circuits of said pair of vacuum tubes and said bias means of said cathode ray tube to cause the spot to brighten at each point corresponding to where said first contact means and said third contact means engage and disengage.

References Cited in the file of this patent

UNITED STATES PATENTS

| | | |
|---|---|---|
| 2,021,766 | Bivens | Nov. 19, 1935 |
| 2,188,159 | Rockwood | Dec. 17, 1940 |
| 2,207,055 | Goodling | July 9, 1940 |
| 2,225,469 | Diebold | Dec. 17, 1940 |
| 2,277,098 | Haines | Mar. 24, 1942 |
| 2,417,070 | Francis | Mar. 11, 1947 |
| 2,422,655 | Hecht | June 24, 1947 |
| 2,439,050 | Mallory | Apr. 6, 1948 |
| 2,536,712 | Bentley | Jan. 2, 1951 |
| 2,600,973 | Comte | June 17, 1952 |
| 2,612,621 | Shepherd | Sept. 30, 1952 |

OTHER REFERENCES

Radar Fundamentals, War Department Technical Manual, T.M. 11–455, July 17, 1941, p. 46.